United States Patent [19]
Ikeda et al.

[11] Patent Number: 4,878,322
[45] Date of Patent: Nov. 7, 1989

[54] INSULATING PLASTIC FILM STRUCTURES AND METHOD

[75] Inventors: George Ikeda, San Francisco; William B. Walker, Sunnyvale, both of Calif.

[73] Assignee: Ikege, Inc., San Jose, Calif.

[21] Appl. No.: 229,374

[22] Filed: Aug. 5, 1988

Related U.S. Application Data

[63] Continuation-in-part of Ser. No. 83,174, Aug. 10, 1987, abandoned.

[51] Int. Cl.$^4$ ............................................. E04B 1/345
[52] U.S. Cl. ............................................. 52/2; 52/83; 52/63
[58] Field of Search ................ 52/2 R, 2 A, 2 G, 2 J, 52/63, 83

[56] References Cited

U.S. PATENT DOCUMENTS

| | | | |
|---|---|---|---|
| 3,791,076 | 2/1974 | Gahler | 52/2 G |
| 3,996,650 | 12/1976 | Tonn | 160/52 |
| 4,036,244 | 7/1977 | Huddle | 52/86 |
| 4,091,584 | 5/1978 | Brown | 52/63 |
| 4,452,230 | 6/1984 | Nelson | 52/2 J |
| 4,583,331 | 4/1986 | Hunt et al. | 52/2 G |

FOREIGN PATENT DOCUMENTS 965582 7/1964 United Kingdom ................ 52/794

Primary Examiner—James L. Ridgill, Jr.
Attorney, Agent, or Firm—William B. Walker

[57] ABSTRACT

A skeletal frame supporting a continuous sealed, flattened plastic film tube for retaining gas under positive pressure. The tube has opposed edges with a flexible film retainer line passing therethrough and extending beyond the end thereof to form edge beads. Guide strips having integral track means are positioned on opposite edges of the guide strip. The guide tracks receive and guide an edge of the flattened film tube drawn therethrough by the retainer line and retain the retainer line and film tube means in place on the skeletal structure. The plastic film tube of the fully assembled structure is a sealed envelope filled with a gas under positive pressure. In the preferred fully assembled wall structure, the plastic film has the form of a flattened four film layer forming two air-filled insulating layers. The film layer is formed from two concentric tubes, sealed at the ends to form a tubular sealed envelope, and the double walls are sealed to form a tubular envelope. The retainer lines extend through the inner tube. The method of assembling this structure is also included in the invention.

5 Claims, 7 Drawing Sheets

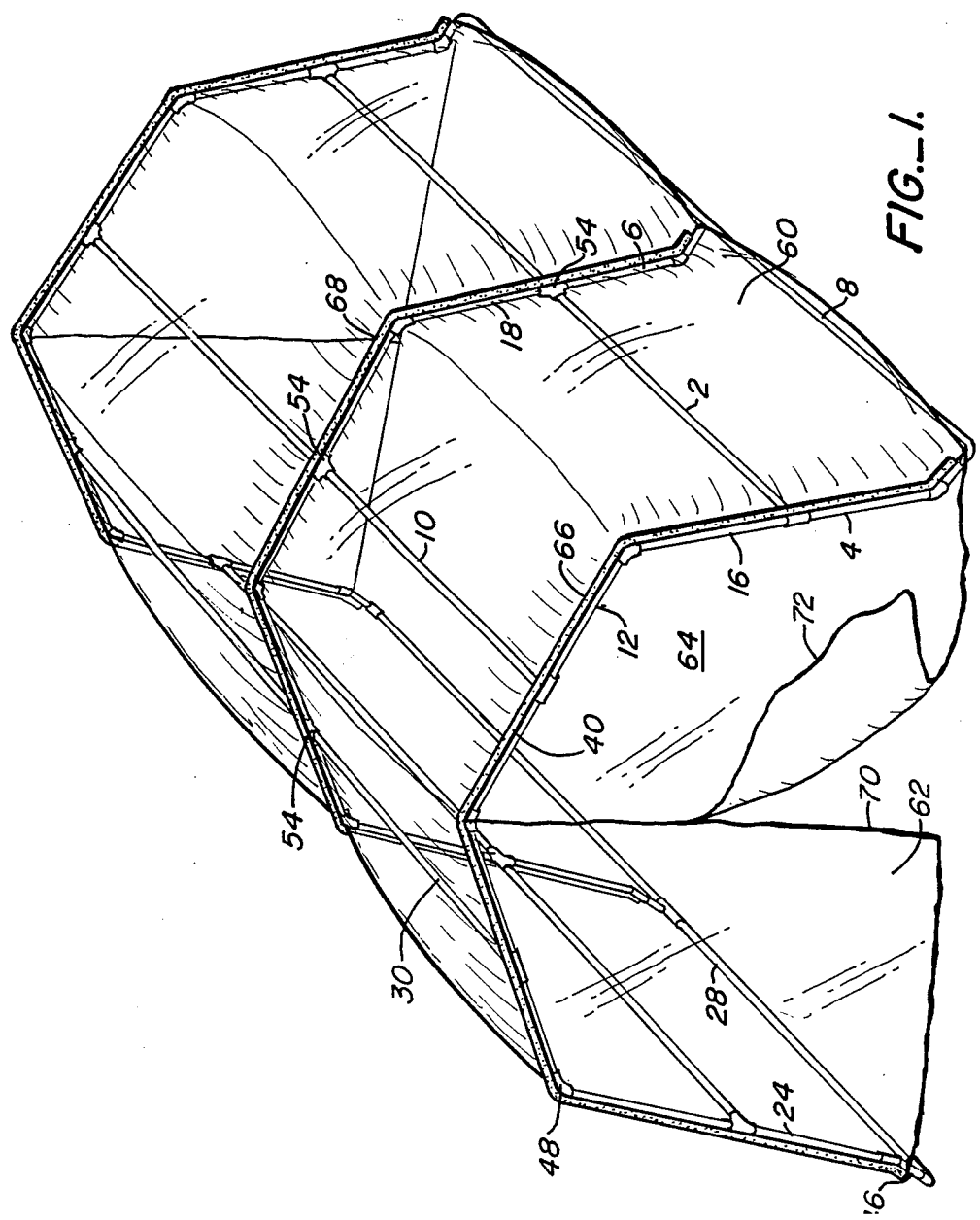

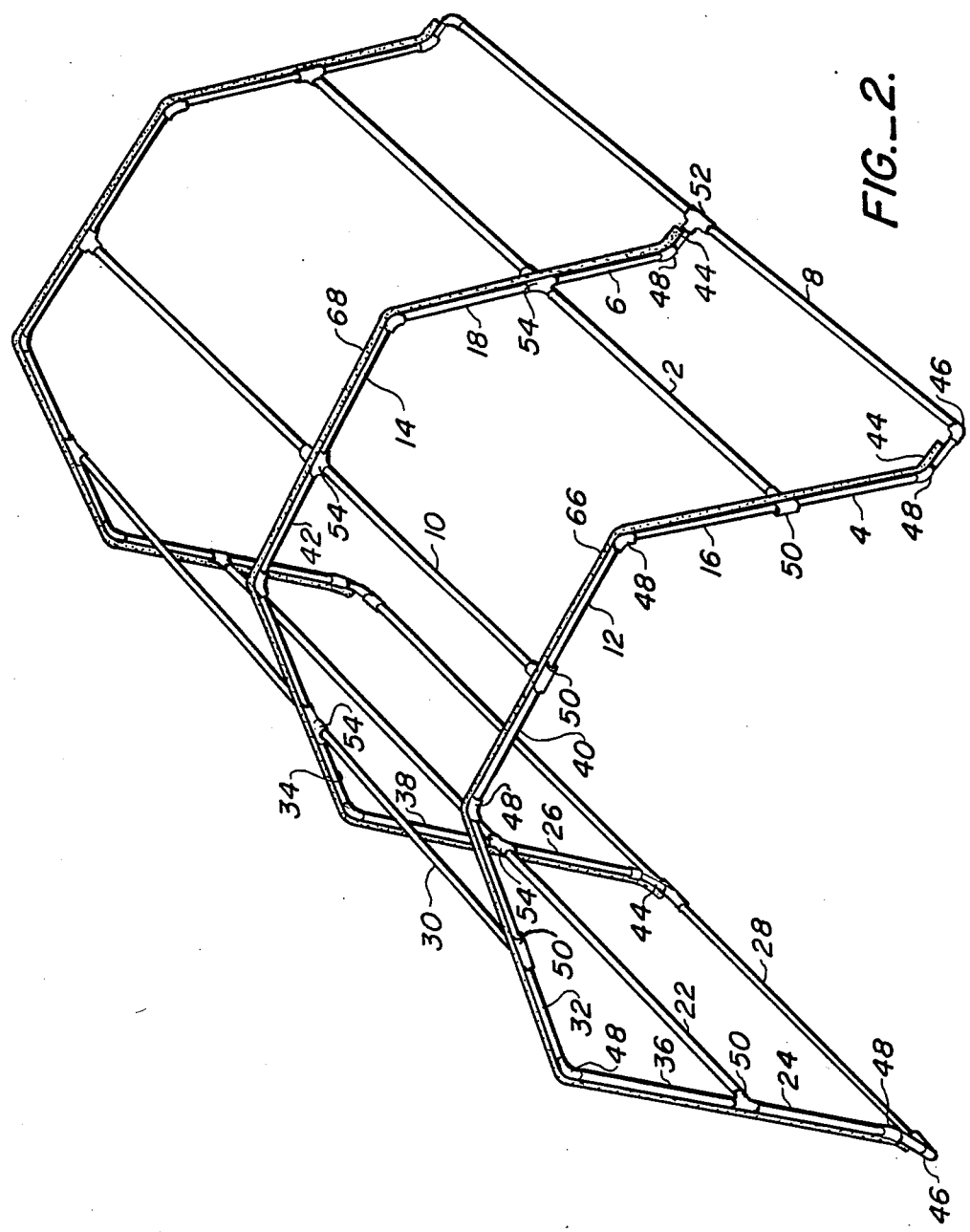
FIG._2.

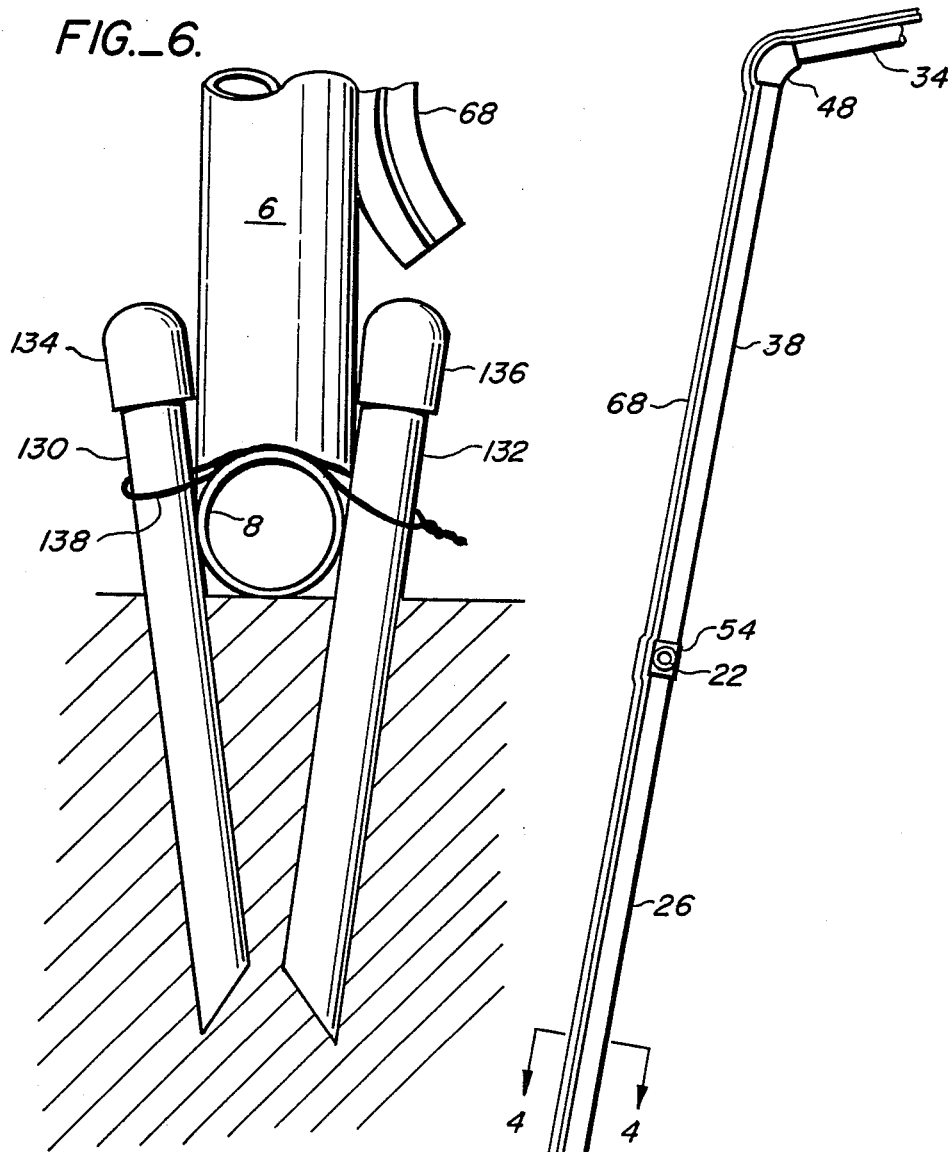
FIG._6.
FIG._3.

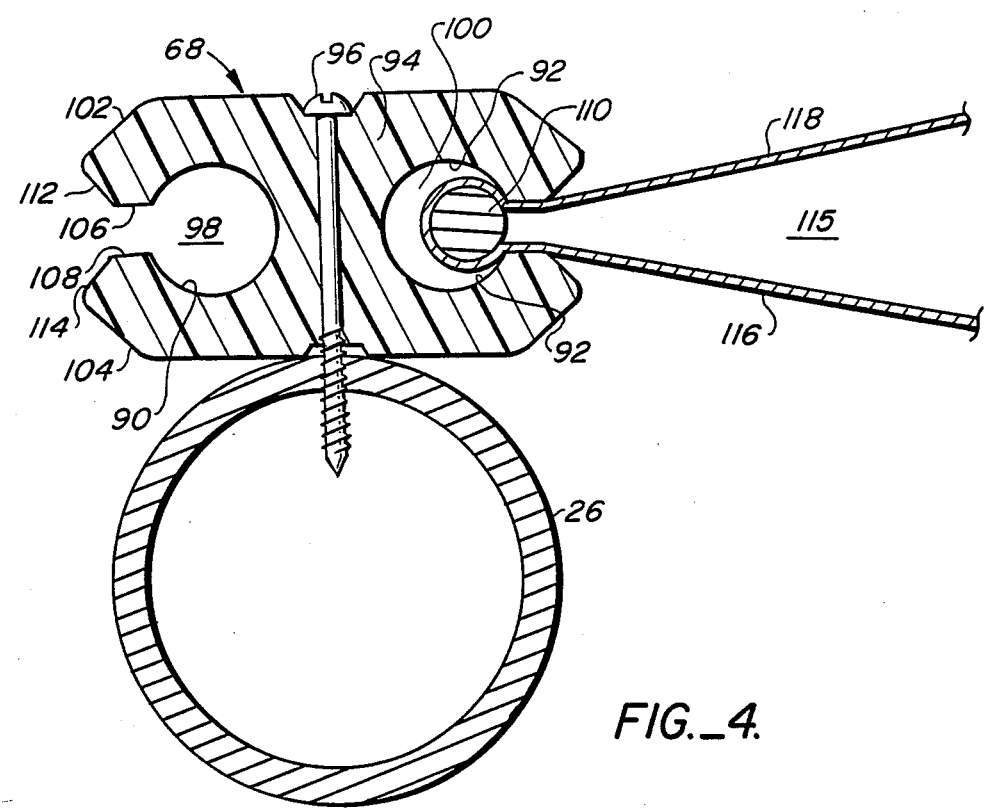
FIG._4.
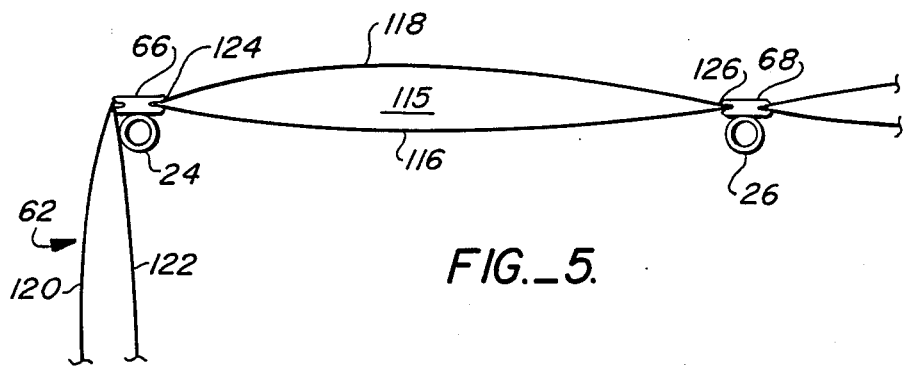
FIG._5.

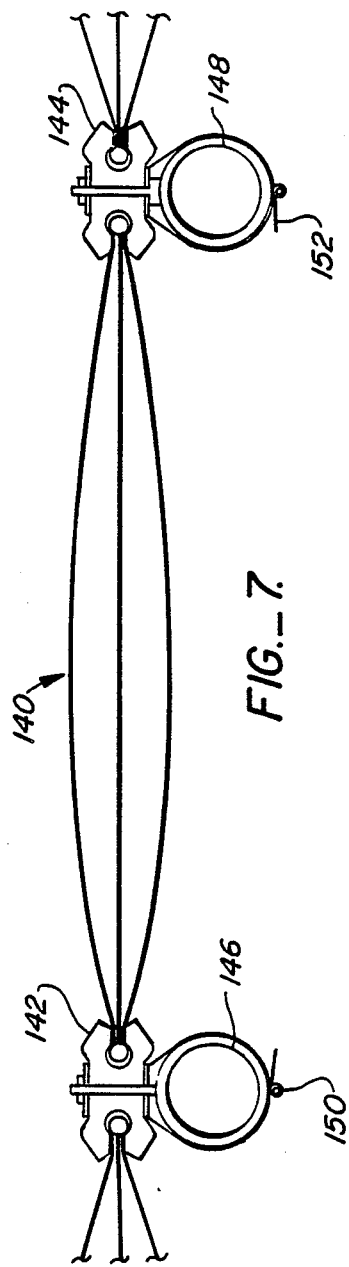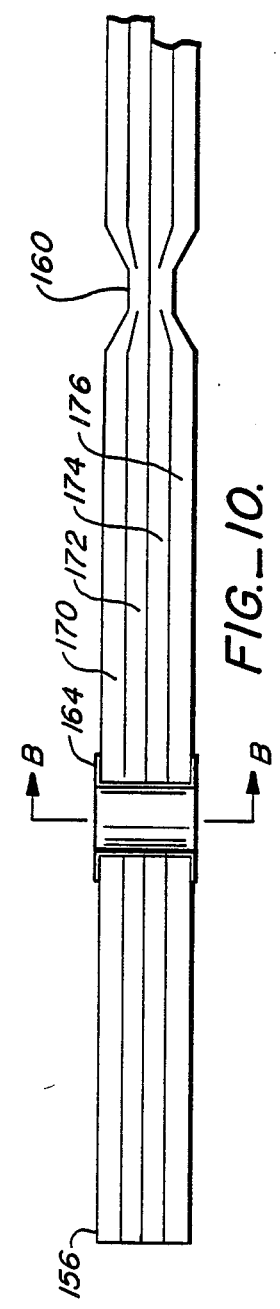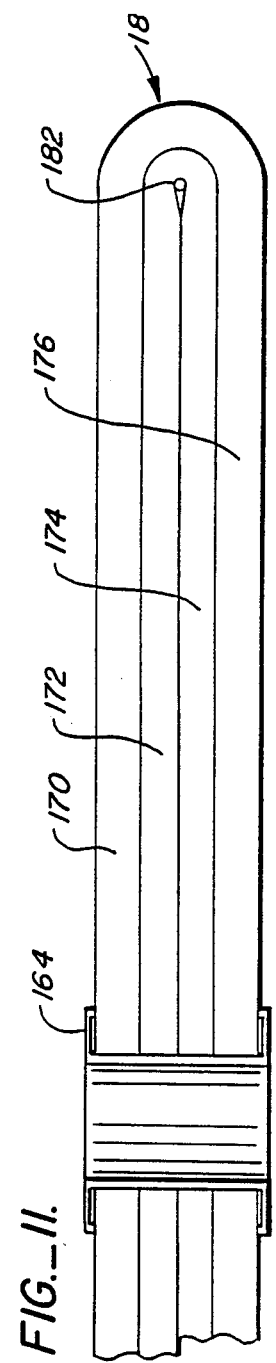

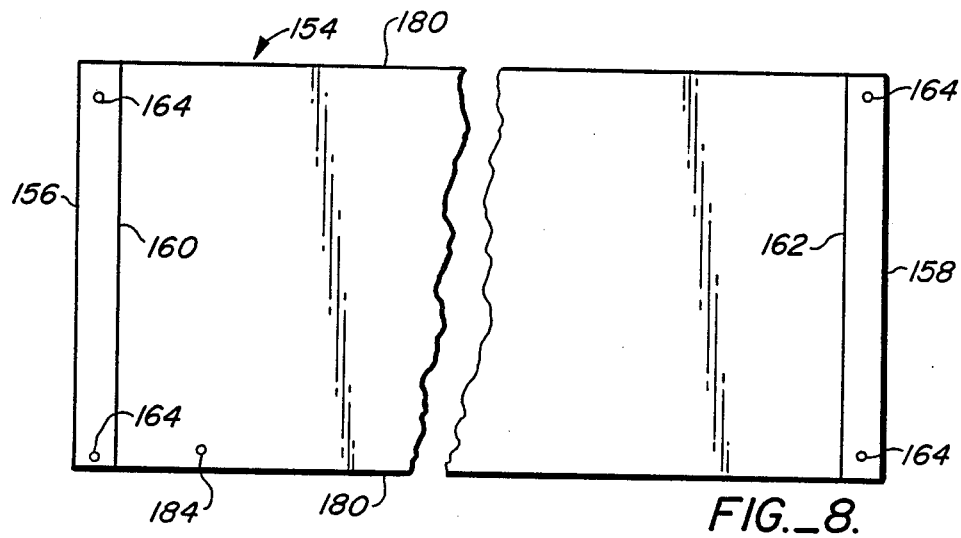
FIG._8.
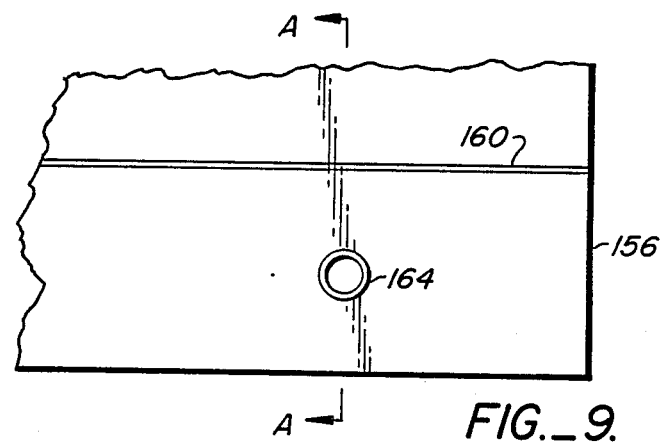
FIG._9.
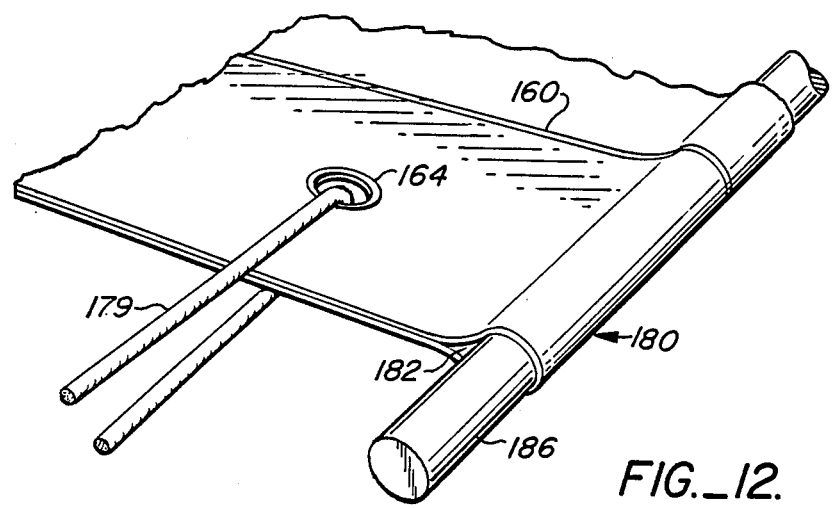
FIG._12.

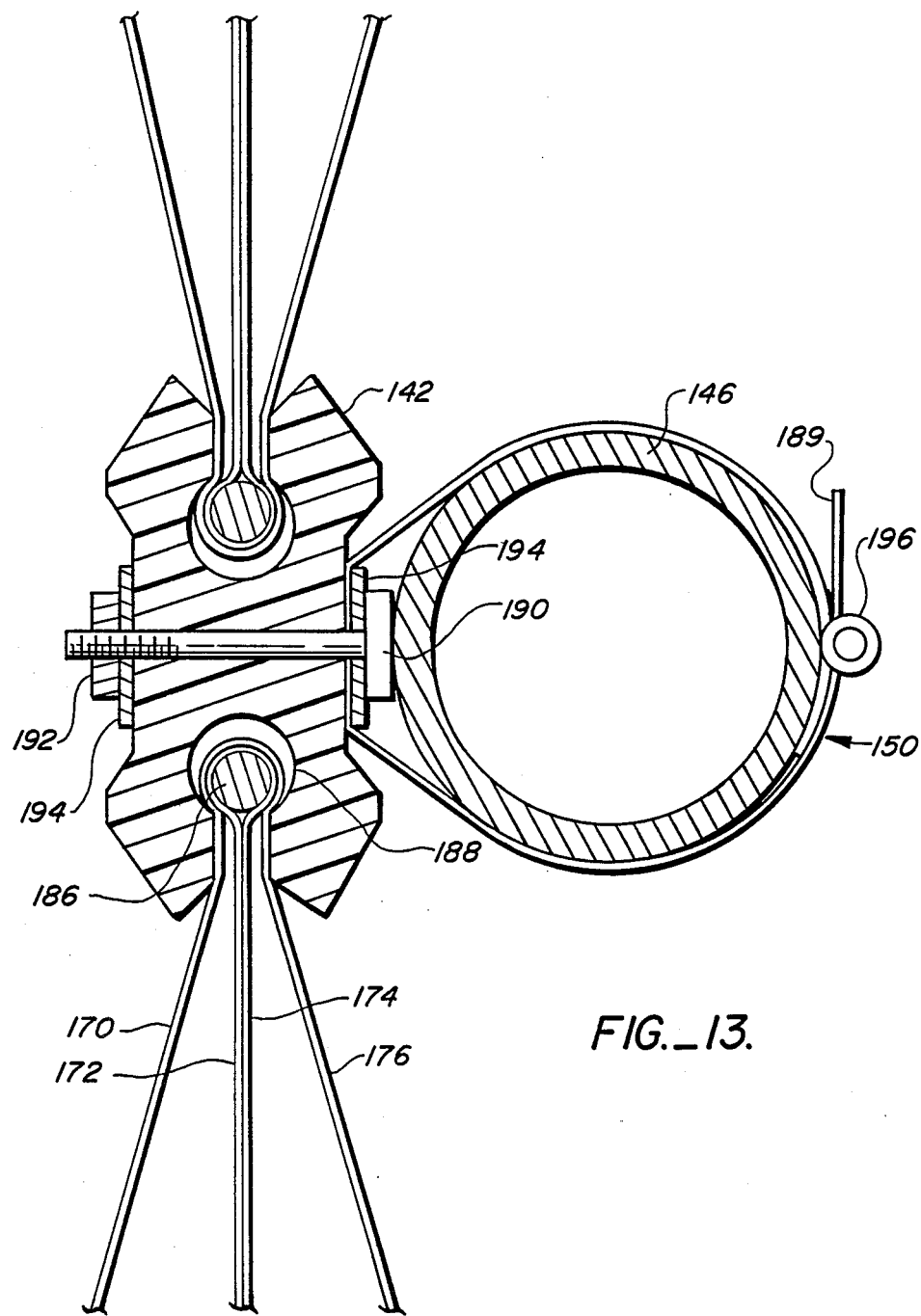
FIG._13.

INSULATING PLASTIC FILM STRUCTURES AND METHOD

RELATIONSHIP TO COPENDING APPLICATION

This application is a continuation-in-part of copending application Ser. No. 83,174 filed Aug. 10, 1987 and now abandoned.

FIELD OF THE INVENTION

This invention relates to plastic film structures which are suitable for use as canopies, greenhouse and other enclosures, shelters and barriers. In particular this invention is a low cost, multi-wall, insulating plastic film structure easily assembled from structural components which facilitate rapid assembly and easy replacement of damaged film panels.

BACKGROUND OF THE INVENTION

A variety of structures have been previously developed which use transparent or translucent polymeric panels and films supported on a structural frameworks. Initial structures were modeled after traditional glass-walled greenhouses and used fiber reinforced flexible plastic panels. In general, the framework was constructed of extruded aluminum, wood or steel elements.

DESCRIPTION OF THE PRIOR ART

Construction of small building structures comprising a skeletal building frame of polyvinyl chloride (PVC) tubing covered with a plastic film is described in U.S. Pat. No. 4,091,584. The film is stretched over the framework and secured to bottom rails with clamps. U.S. Pat. No. 3,996,650 shows a plastic film clamp construction and a skeletal building frame to which plastic film is clamped. In general, the film is wrapped around a round linear member, a clamping piece is placed over the film, pressing it against the linear member. The film is secured to the frame only where it is clamped.

To secure the entire margin of plastic film to a skeletal building frame, linear structural members were formed of wood or metal with linear grooves or other surfaces against which the film is secured. In U.S. Pat. No. 3,930,344, film 42 is pressed against the surface of a rounded groove (FIG. 10) by a rod 62 and bolted clamping plate 64. In U.S. Pat. No. 3,765,134, film is pressed against a flat abutment surface of a purlin by the flat abutment surface of abutment member 41 (FIG. 15 and FIG. 17), pressed by bolted clamping plate 46. These constructions require expensive, specially configured structural members and extensive labor to assembly the frame and secure the film. U.S. Pat. No. 4,233,958 shows another structure made of hexagonal panels formed by a metal frame with a clamping groove (FIG. 3) in which film is clamped with a linear T-shaped plastic strip.

U.S. Pat. No. 4,452,230 discloses a more elaborate canopy system for a building structure using rigid, linear elements to support tubes of flexible material. In FIG. 7-9, the fabric material is sewn surrounding four cords 40 to form a box construction. The cords are then pulled through linear grooves in rigid linear elements 43. A structure made of plastic film is shown in FIG. 6. The "joins" of the plastic tube box structure are formed by rectangular corner bars 23 which extend within the flanges of the rigid channel section 24. This construction requires elaborate, expensive structural elements and laborious assembly of the components. U.S. Pat. Nos. 2,950,727, 2,986,150, and 4,036,244 are also directed to film structures where beaded edges of a single layer film are retained by opposing channels to hold the film in position on a frame.

U.S. Pat. No. 4,273,099 discloses a solar heated building construction with a roof or cover made of a continuous plastic film element with a transparent portion and a light reflecting portion. Machinery is provided for moving the film to change the position of the reflective and/or transparent portions so as to control the reception of the sun's rays by the building interior. The cable reinforced margins of the film are threaded into a slot 44 of a rigid structural guide member 42 and held in place by inflatable tube 48 (FIG. 5). When the tube 48 is expanded, it forms a seal between the surface of the plastic film and the opposing surface of the slot.

Plastic film has been clamped to structural members in U.S. Pat. No. 4,305,235 to form a heat conservation system for greenhouses. U.S. Pat. No. 4,352,259 describes a panel made of longitudinal tubes of plastic material which can be stored on the sides of the structure when deflated, and then inflated to form a false ceiling. Construction of rigid building shells using mold surfaces of clamped plastic film is shown in U.S. Pat. No. 4,365,455.

SUMMARY OF THE INVENTION

The plastic film structure of this invention comprises a skeletal frame supporting a continuous sealed, flattened plastic film tube means for retaining gas under positive pressure. The tube has opposed edges with a flexible film retainer line passing therethrough and extending beyond the end thereof to form edge beads. The skeletal frame can have both side and top portions and have a plurality of flexible guide strips mounted in a parallel relationship thereon, each guide strip extending along at least a portion of the frame. Each guide strip comprises integral track means positioned on opposite edges of the guide strip, a guide track means on an edge of one guide strip opposing a guide track means on an oppposing edge of an adjacent guide track means. The guide tracks are a means for receiving and guiding an edge of the flattened film tube means drawn therethrough by the retainer line and retaining the retainer line and film tube means in place on the skeletal structure. The walled structure can comprise first and second sidewalls and a top portion, and each guide strip can be bent to extend upward along at least a portion of the first side sidewall, across the top portion, and downward along at least a portion of the second sidewall. The plastic film tube means of the fully assembled structure is a sealed envelope filled with a gas under positive pressure.

In the preferred fully assembled wall structure, the plastic film has the form of a flattened four film layer forming two air-filled insulating layers. The film layer is formed from two concentric tubes, sealed at the ends to form a tubular sealed envelope, and the double walls are sealed to form a tubular envelope. The retainer lines extend through the inner tube.

In the method of this invention for forming a walled structure, the retainer lines are threaded into and drawn through a guide track means of a flexible guide strip mounted on the skeletal structure, drawing the flattened film tube means through the a guide track means to position the flexible film tube on the structure. Gas is introduced into the sealed envelope under positive pressure after it is positioned on the skeletal structure.

BRIEF DESCRIPTION OF THE DRAWINGS

FIG. 1 is an isometric view of a shelter embodiment of this invention with the film layers positioned outside of the frame structure.

FIG. 2 is an isometric view of the frame skeleton with the flexible guide strips mounted thereon.

FIG. 3 is a partial front view of assembled truss members having a flexible guide strip mounted thereon.

FIG. 4 is a cross-sectional view of a frame mameber, with guide strip mounted thereon, taken along the line 4—4 in FIG. 3.

FIG. 5 is a partial schematic view showing the plastic film envelope supported between two flexible mounting strips.

FIG. 6 is a partial cross-sectional view showing the peg assembly by which the shelter of this invention can be securely anchored to the ground without the necessity for a structural foundation.

FIG. 7 is a partial cross-sectional schematic view of the double-insulating four film layered embodiment of this invention.

FIG. 8 is top view of a four film layered flattened double tube.

FIG. 9 is a fragmentary view of a corner of the four film layered flattened double tube of FIG. 8.

FIG. 10 is a cross-sectional view taken along the line A—A in FIG. 9 showing the seal and tie-down grommet.

FIG. 11 is a cross-sectional view taken along the line B—B in FIG. 10 showing the edge and grommet.

FIG. 12 is a fragmentary isometric view of the corner of the four film layered flattened double tube with retainer line and tie-down line in place.

FIG. 13 is a partial cross-sectional view showing the flexible guide secured to a tubular support by a strap and the double-insulating four film layered embodiment of FIG. 7.

DETAILED DESCRIPTION OF THE INVENTION

The shelters of this invention are easily and economically constructed from preformed tubular and film elements which can be made from readily available materials. FIG. 1 is an isometric view of one embodiment of this shelter with the film layers positioned outside of the frame structure, and FIG. 2 is an isometric view of the frame skeleton with the flexible guide strips mounted thereon.

The frame work is formed from tubular plastic or metal members joined by conventional joining fixtures to form frame segments. Side purlin 2 is supported by upright trusses 4 and 6 extending from a base member 8. Roof purlin 10 is connected to and supported by rafter members 12 and 14 which are in turn supportingly connected with upright truss members 16 and 18. On the opposite side, side purlin 22 is supported by upright trusses 24 and 26 extending from a base member 28. Roof purlin 30 is connected to and supported by rafter members 32 and 34 which are in turn supportingly connected with truss members 36 and 38. The opposing roof purlins 10 and 30 are connected by rafter elements 40 and 42. The upright trusses 4, 6, 24 and 26 can be connected to the respective base members 8 and 28 by short angular members 44.

These frame members are formed from plastic or metal tubing and are joined by conventional joining elements such as elbows 46 and 48, tees 50 and 52, and cross-pieces 54. This structure can be extended by joining identical structures of peak and side purlins, trusses, rafter members and base members to the initial members with tees 52 and cross-pieces 54.

Plastic members such as polyvinyl tubing can be fixed to plastic joints with conventional vinyl glues. Aluminum elements can be similarly joined with epoxy glues and the like. Copper tubular and joint members such as copper tubing and copper elbows, tees and cross-piece junctions can be used, joined with solder or junctions secured to the tubes with set-screws. Magnesium alloy tubes and joints are preferred for strength and resistance to environmental corrosion.

Plastic film panels 60, 62 and 64 are mounted to the skeletal tubing structure by flexible guide strips 66 and 68 shown in FIG. 2 and shown in greater detail in FIG. 3 and FIG. 4. Panel 60 extends from the base member 8 to the opposite base member 28, supported in a roof structure by flexible guide strips 66 and 68 mounted on the exterior surface of the respective truss elements. End film panels 62 and 64 are mounted to flexible guide strip 66, extending to the ground. The adjacent edges 70 and 72 of the end film panels 62 and 64 can be joined by any conventional means, but are preferably reversibly joined and easily separated. A simple joining means such as grommets, snaps, catches or VELCRO strips can be used for this purpose.

The horizontal purlins 2, 10, 22 and 30 are joined to the support trusses and rafters at a position spaced from the elbow joints 48 to avoid local stretching and possible rupture of the film by elbow joints at the bends as the tubing is drawn through the flexible guide strips.

FIG. 3 is a partial front view of assembled truss members having a flexible guide strip mounted thereon. In this embodiment, the side wall is formed by two upright truss elements 26 and 38, joined to a horizontal base element 28 and a side purline 22. The roof is formed by two rafter members 34 and 40 joined to a horizontal roof purlin 30. The upright truss member 38 is connected to the rafter member 34 by elbow 48.

Flexible guide strip 68 is secured to the outside of the truss elements 26 and 38, and to the outside of the rafter elements 34 and 40, extending from the base 28 upward across the roof structure and down the opposite side to an opposite base member (not shown). The end 70 of the flexible strip 68 extends away from the support member 44 so as to facilitate threading the guide ropes into the groove 72 as will be explained in greater detail hereinafter. The base can be secured to the ground by pegs 74 as shown in greater detail in FIG. 6.

FIG. 4 is a cross-sectional view of a frame member, with guide strip and film mounted thereon, taken along the line 4—4 in FIG. 3.

The flexible guide strip 68 has spaced apart guide surfaces 90 and 92. The guide surfaces 90 and 92 are separated by central mounting section 94 through which a fastener such as a screw 96 extends to the wall of the truss 26. The guide surfaces 90 and 92 are a portion of the surface of the identical but opposite grooves 98 and 100. The mouth of groove 98 comprises opposing lips 102 and 104, the distance between the opposing surfaces 106 and 108 thereof being less than the thickness of a retainer line such as the retainer line 110 positioned in opposite groove 100 so the retainer line is retained within the groove when under lateral tension.

In the preferred embodiment shown in FIG. 4, the internal guide tracks or grooves 98 and 100 face in opposite directions. The lips comprise a pair of spaced apart, opposed inner retaining surfaces 90 and 92. Each retaining surface such as surface 90 merges into diverging bearing surfaces 112 and 114.

The film envelope 115 supported by the guide track 100 comprises a tubular film with an internal portion 116 and an external portion 118, sealed at the ends and having a retainer lines 110 extending through opposing edges thereof. Each retainer line 110 is threaded into and pulled through the track 100, from one end to the other, drawing the tubular film along with it. The distance between the opposing lip surfaces such as 106 and 108 is smaller than the diameter of the retaining line 110, preventing its release from the groove under lateral tension. The diameter of the tracks 98 and 100 are substantially larger than the diameter of the retaining lines 110, thereby permitting the lines to be drawn through the tracks without being pinched.

The flexible guide strip should be selected of elastomeric or flexible polymer materials which will remain flexible at temperatures to which it will be exposed which can range from artic conditions as low as $-50°$ C. up to desert temperatures of $60°$ C. For most agricultural zones, temperatures range from $-20°$ C. up to about $50°$ C. The guide strip should be selected of material or contain sufficient ultraviolet stabilizers and other protective agents to not significantly deteriorate when exposed to direct sunlight for 10 years. Suitable polymers are butadiene and other olefin homopolymers and copolymers such as polybutadiene, butadiene-styrene, and other flexible and/or elastomeric olefin polymers such as polyisoprene.

They can be filled with carbon or other light opaque material or incorporate sun shield (ultraviolet stabilizers) which protect the polymer structure from sunlight. They should have a life of at least 5 years and preferably greater than 10 years.

The film materials can be any transparent or translucent conventional film materials with sufficient ultraviolet stabilizer to prevent rapid deterioration in sunlight. Examples of suitable film materials are polyester films, polyolefin films with sun shield layers or ingredients of light protecting chemicals.

FIG. 5 is a partial schematic view showing the plastic film envelope supported between two flexible mounting strips after assembly. The tubular film has outer and inner surfaces 118 and 116 and extend around and between the opposed retaining lines 124 and 126, supported by tracks in the respective flexible strips 66 and 68, in turn mounted on upright trusses 24 and 26. After assembly, a gas such as air is introduced into the film envelope, expanding the tube and moving the surfaces 116 and 118 apart. This provides an insulating structure. The increased tension of the inflated structure further strengthens the overall structure. Front panel 62 and the rear panels can have a similar construction of opposed walls 120 and 122 held in a retaining track groove by a retaining line 128.

FIG. 6 is a partial cross-sectional view showing the peg assembly by which the shelter of this invention can be securely anchored to the ground without the necessity for a structural foundation. Pegs 130 and 132 are made of pipe or tubing with caps 134 and 136 to absorb the impact of a hammer or other driving tool and pointed tips. These pegs are driven into the ground at a converging angle on both sides of the base tubing 8, and a wire, cord or other suitable flexible material 138 is looped between the pegs across the top of the tubing 8, and tightened to form a fixed retaining loop holding the tubing 8 against the ground. The converging angle of the tubes prevent their withdrawal as a unit. If the peg unit is to be moved or disassembled, the retaining loop 138 is removed, permitting the easy removal of the pegs 130 and 132 by withdrawing each individually from the ground, pulling along its individual axis.

FIG. 7 is a partial cross-sectional schematic view of the double-insulating four film layered embodiment of this invention. The four layered film insulating wall 140 extends between adjacent flexible strips 142 and 144. Each of the strips 142 and 144 are secured to a support tube 146 and 148, respectively, by a binding strap 150 and 152.

FIG. 8 is top view of a four film layered flattened double tube. The film walls are formed by a double tube, that is, concentric film tubes, one within the other, flattened to form a four film structure 154. The opposing ends 156 and 158 are heat sealed along seams 160 and 162 to form a sealed tubular envelope. Two or more tie-down grommets 164 and 166 are positioned along both ends of the tube, between the seal seams 160 and 162 and the ends.

FIG. 9 is a gragmentary view of a corner of the four film layered flattened double tube of FIG. 8 and FIG. 10 is a cross-sectional view taken along the line A-A in FIG. 9 showing the seal and tie-down grommet. Along the full length of the seam 160, the film sections 170 and 172 of one side of the tube and the film sections 174 and 176 of the other side of the tube are fused or welded into an integral, gas tight seam 160. Along all but the ends, the adjacent surfaces 172 and 174 are also fused.

FIG. 11 is a cross-sectional view taken along the line B-B in FIG. 10 showing the edge 180 of the tube and tie-down grommet 164. The flattened tubing forms a tubular envelope defined by the upper sections 170 and 174 and the lower sections 176 and 178. The adjacent surfaces of the inner tube walls 172 and 174 are not sealed adjacent the edges 180, leaving an opening 182 along the edge fold through which retainer lines are passed before the tubing is assembled on the structure.

FIG. 12 is a partial, isometric view of the assembled tubing and retainer line 186, showing a tie-down rope passing through the grommet 164. The tie-down rope 179 can be used to tie the end of the tubing to horizontal tubing 8 (FIG. 1). To increase ventilation in the shelter, the ties can be released, and the ends of the tubing raised to permit air circulation through the shelter.

FIG. 13 is a partial cross-sectional view showing the flexible guide secured to a tubular support by a strap and the double-insulating four film layered embodiment of FIG. 7. The tubing 140 (FIG. 7) has been inflated, and the adjacent walls of the tubular envelope 170 and 172, and 174 and 176 are separated by the air or other gas which has been introduced into the tube through sealed inlet port 184 shown in FIG. 8. This provides a double insulating system and places tension between the adjacent support tubes, reinforcing the structure. The film tubing passes around retainer line 186, forming a bead which is retained in the channel 188 of flexible strip 142. The retainers lines are pulled through the flexible strips to mount the film as described above.

In this embodiment, the flexible strips 142 are mounted on the support tubing by a conventional strap 150 comprising a serrated strip of metal 189, attached to the flexible strip by a bolt 190 and nut 192 with washers 194. The strip is tightened by the screw 196. Alternatively, any type of strap or wire fasteners can be used which can be attached to the flexible strip, including plastic straps with latch catches, and the like. The flexible strip should be made of materials which resist environmental degradation from temperature, moisture, corrosive sprays, and solar radiation.

The invention has been illustrated with the guide strips mounted on the exterior of a tubular structure. It can be equally well be mounted on the interior of a skeleton structure, and the structure can be made of other materials such as wood, extruded metal and the like. All of these variations are considered to be included within the intended scope of this invention.

The structures of this invention can be easily and rapidly assembled with a minimum of labor. The use of a tubular support structure is preferred because of the ease of assembly, the ready availability of the construction materials, the inherent strength of tubular elements, and the savings in labor and material costs it provides. The shelters of this invention require no fixed foundation and thus are entirely moveable. The base members can be secured to the ground with simple stakes, driven into the ground without further preparation. The ends of the structure can be open or closed, depending upon the environmental requirements within the structure.

The manufacture of parts and assembly of the structure of this invention provides numerous advantages over conventional greenhouses and similar structures. A minimum of special parts are required, special parts can be easily made and preassembled, tubing can be precut to lengths and bent as needed, and the joints can be conventional off-the-shelf parts. The structures can be assembled with conventional hand tools. All parts can be assembled on site. The components can be transported to the assembly site with standard trucks. Foundations are not required. The structure can be easily disassembled and reassembled at another site without requiring replacement of any parts.

The structure of this invention also offers numerous advantages over the currently conventional greenhouse structures. The double insulating layer structure provides superior insulation and thermal control. If the film structure is placed on the exterior of the skeletal frame, the insulating capacity is optimized because a minimum of conductive metal parts are exposed to the external environment. The framing and plastic are resistant to salt air. If exposed to unusually severe wind velocities, the bead will be pulled from the flexible guide tracks before the skeletal structure is damaged. Damaged or deteriorated tubing sections can be quickly removed and replaced with a minimum of manpower.

The structures of this invention are useful as agricultural shelters such as greenhouses or other structures where environmental control is required. They can also be used to cover waterways to reduce evaporation or to encompass aquacultural systems. Finally, they are useful as shelters for vehicles, farm implements, hay and other materials requiring shelter from the weather, and the like. With the insulating configuration of the four layered, double insulating as shown in FIG. 7, the shelter permits greater temperature control, retaining ambient temperatures throughout the night and increasing the effective growth rate of greenhouse plants. The shelter can thus be used with greater heat efficiency in colder regions and seasons.

I claim:

1. A walled structure comprising a skeletal frame supporting a flattened plastic film tube means for retaining gas under positive pressure, the flattened tube means comprising an inner film tube surrounded by an outer film tube axially concentric therewith, the inner and outer tubes being flattened to form a four-wall plastic film structure with adjacent ends and opposed side edges, each inner tube open end forming an air-tight seal with an adjacent outer tube open end to form a tubular sealed envelope, a flexible film retainer line passing through the inner tube adjacent each opposed side edge thereof, the skeletal frame having side and top portions and having a plurality of flexible guide strips mounted in a parallel relationship thereon, each guide strip extending along at least a portion of the frame, each guide strip comprising integral track means positioned on opposite edges of the guide strip, a guide track means on a edge of one guide strip opposing a guide track means on an opposing edge of an adjacent guide track means, the guide track means constituting means for receiving and guiding a side edge of the four-wall plastic film structure drawn therethrough by the retainer line and retaining the retainer line and four-wall plastic film structure in place on the skeletal structure.

2. The walled structure of claim 1 wherein the skeletal frame has first and second sidewalls and a top portion, and each guide strip is bent to extend upward along at least a portion of the first sidewall, across the topportion, and downward along at least a portion of the second sidewall.

3. The walled structure of claim 1 wherein space between the inner tube and the outer tube of the four-wall plastic film structure is filled with a gas under positive pressure.

4. The walled structure of claim 1 wherein the flexible guide strips are fastened to the skeletal frame by flexible straps attached to the flexible guide strips.

5. A method for forming a walled structure comprising a skeletal frame supporting a flattened plastic film tube means for retaining gas under positive pressure, the flattened tube means comprising an inner film tube surrounded by an outer film tube axially concentric therewith, the inner and outer tubes being flattened to form a four-wall plastic film structure with adjacent ends and opposed side edges, each inner tube open end forming an air-tight seal with an adjacent outer tube open end to form a tubular sealed envelope, a flexible film reatiner line passing through the inner tube adjacent each opposed side edge thereof, the skeletal frame having side and top portions and having a plurality of flexible guide strips mounted in a parallel relationship thereon, each guide strip extending along at least a portion of the frame, each guide strip comprising integral track means positioned on opposite edges of the guide strip, a guide track means on an edge of one guide strip opposing a guide track means on an opposing edge of an adjacent guide track means, the guide track means constituting means for receiving and guiding a side edge of the four-wall plastic film structure drawn therethrough by the retainer line and retaining the retainer line and four-wall plastic film structure in place on the skeletal structure, wherein each of the retainer lines is threaded into and drawn through a guide track means of a flexible guide strip mounted on the skeletal structure, drawing the flattened film tube means through the guide track means to position the flexible film ube on the structure.

* * * * *